United States Patent
Elbs et al.

(10) Patent No.: US 7,665,793 B2
(45) Date of Patent: Feb. 23, 2010

(54) ROLLER BLIND SYSTEM FOR A VEHICLE ROOF

(75) Inventors: Norbert Elbs, Munich (DE); Horst-Martin Schulz, Weil (DE); Thomas Stemmer, Munich (DE)

(73) Assignee: Webasto AG, Stockdorf (DE)

( * ) Notice: Subject to any disclaimer, the term of this patent is extended or adjusted under 35 U.S.C. 154(b) by 616 days.

(21) Appl. No.: 11/568,366

(22) PCT Filed: Apr. 20, 2005

(86) PCT No.: PCT/EP2005/004207

§ 371 (c)(1), (2), (4) Date: Oct. 26, 2006

(87) PCT Pub. No.: WO2005/102803

PCT Pub. Date: Nov. 3, 2005

(65) Prior Publication Data

US 2007/0221339 A1    Sep. 27, 2007

(30) Foreign Application Priority Data

Apr. 26, 2004   (DE) ................. 10 2004 020 335

(51) Int. Cl.
*B60J 3/02* (2006.01)
(52) U.S. Cl. .................................... 296/97.4
(58) Field of Classification Search ........... 296/97.4, 296/97.7, 97.8, 97.9, 97.11, 140, 141; 160/265, 160/370.22, 120
See application file for complete search history.

(56) References Cited

U.S. PATENT DOCUMENTS

| | | | |
|---|---|---|---|
| 4,466,656 A * | 8/1984 | Igel | 296/216.02 |
| 5,709,427 A | 1/1998 | Färber et al. | |
| 6,520,239 B2 * | 2/2003 | Schlecht et al. | 160/120 |
| 6,682,133 B2 * | 1/2004 | Glasl | 296/216.01 |
| 6,695,381 B2 * | 2/2004 | Schlecht et al. | 296/97.4 |
| 6,729,684 B2 | 5/2004 | Arnold et al. | |
| 6,910,518 B2 | 6/2005 | Zimmermann et al. | |
| 7,387,329 B2 * | 6/2008 | Mollick et al. | 296/97.8 |
| 7,469,960 B2 * | 12/2008 | Koelbl et al. | 296/214 |

FOREIGN PATENT DOCUMENTS

| | | |
|---|---|---|
| DE | 195 27 746 C1 | 6/1996 |
| DE | 197 13 348 C1 | 7/1998 |
| DE | 197 50 715 C1 | 11/1998 |
| DE | 19750715 C1 | 11/1998 |
| DE | 10327352 A1 | 1/2004 |
| DE | 103 33 474 A1 | 2/2004 |
| EP | 1 129 871 A1 | 9/2001 |
| FR | 2786809 A1 | 6/2000 |

* cited by examiner

*Primary Examiner*—H Gutman
(74) *Attorney, Agent, or Firm*—David S. Safran; Roberts Mlotkowski Safran & Cole, P.C.

(57) ABSTRACT

A shade system for a motor vehicle roof, with at least one first and one second shade arrangement which are arranged in line with one another in the lengthwise direction of the roof and each have a take-up shaft, a shade on which can be taken up thereon, and a pull which acts on the free end of the shade, and at least one compressively stiff drive cable which is driven by a drive and which is securely coupled at a first location to the pull of the first shade arrangement. The drive cable is securely coupled at a second point to the pull of the second shade arrangement in a first segment of motion of the second point and in a subsequent second segment of motion of the second point is decoupled from the pull of the second shade arrangement, the coupling or decoupling taking place automatically a locking element.

24 Claims, 4 Drawing Sheets

ROLLER BLIND SYSTEM FOR A VEHICLE ROOF

BACKGROUND OF THE INVENTION

1. Field of the Invention

This invention relates to a shade system for a motor vehicle roof with at least one first and one second shade arrangement which are arranged offset to one another in the lengthwise direction of the roof and each have a take-up shaft, a length of shade which proceeding from its one end can be taken up thereon, and a pull which acts on the free end of the length of shade, and at least one compressively stiff drive cable which is driven by a drive and which is securely coupled at a first point to the pull of the first shade arrangement.

2. Description of Related Art

If a shade system with two shade arrangements is to be driven by a drive system and the two shade arrangements have a different extension length, conventionally each shade arrangement is assigned a separate drive consisting of an electric motor-driven pinion and two pinion-driven drive cables which each act strongly on one of the two lateral ends of the pull. One alternative possibility would be to drive the two separate drive cable systems which encompass two drive cables at a time by means of a common motor and an intermediate gearwheel. In any case this shade system is rather complex due to use of four drive cables and two motors or one motor and one intermediate gearwheel.

A generic shade system is described in DE 197 50 715 C1, two drive cables being driven by a common pinion and on each of the two ends of each cable there being a driver. The two shade arrangements have a different extension length, one of the two drivers being securely connected to the pull of the shade with the greater extension length. The length of the drive cables is dimensioned such that when the shades arranged back to back are pulled out, first the shade with the longer extension length is pulled out a distance by means of the securely mounted driver before the two free drivers are placed against the pull of the shade with the shorter extension length, then the two shades being jointly extended up to their full length.

DE 103 27 352 A1 describes a drive system for a motor vehicle roof, one motor driving two pinions which for their part in turn again drive two drive cables.

DE 103 33 474 A1 discloses a drive system for a motor vehicle roof, a motor driving two drive cables which jointly drive a sliding cover of the vehicle roof and a shade located underneath the sliding cover opening.

SUMMARY OF THE INVENTION

The object of this invention is to devise a driven shade system for a motor vehicle roof with two shade arrangements which allows different extension lengths of the two shade arrangements in which the pulls when moved always engage the drive cable, and which still has a simple and economical structure.

This object is achieved as claimed in the invention by a shade system as claimed in claim 1. Here it is advantageous that by providing an automatic locking element for the detachable coupling of the drive cable which is coupled securely to the first shade arrangement to the second shade arrangement, the two shade arrangements even for a different extension length can be driven by the same drive cable. In this way it is possible to drive the shade system with only a single drive cable or for bilateral driving with two drive cables and in the case of motion to always have a secure connection of the pull to the drive cable. In this way an economical, compact construction with as few parts as possible which is also suited for shade systems with center-driven pull is implemented.

Preferred embodiments of the invention will become apparent from the dependent claims.

Examples of the invention are detailed below by way of example with reference to the attached drawings.

DETAILED DESCRIPTION OF THE INVENTION

Figure 1:
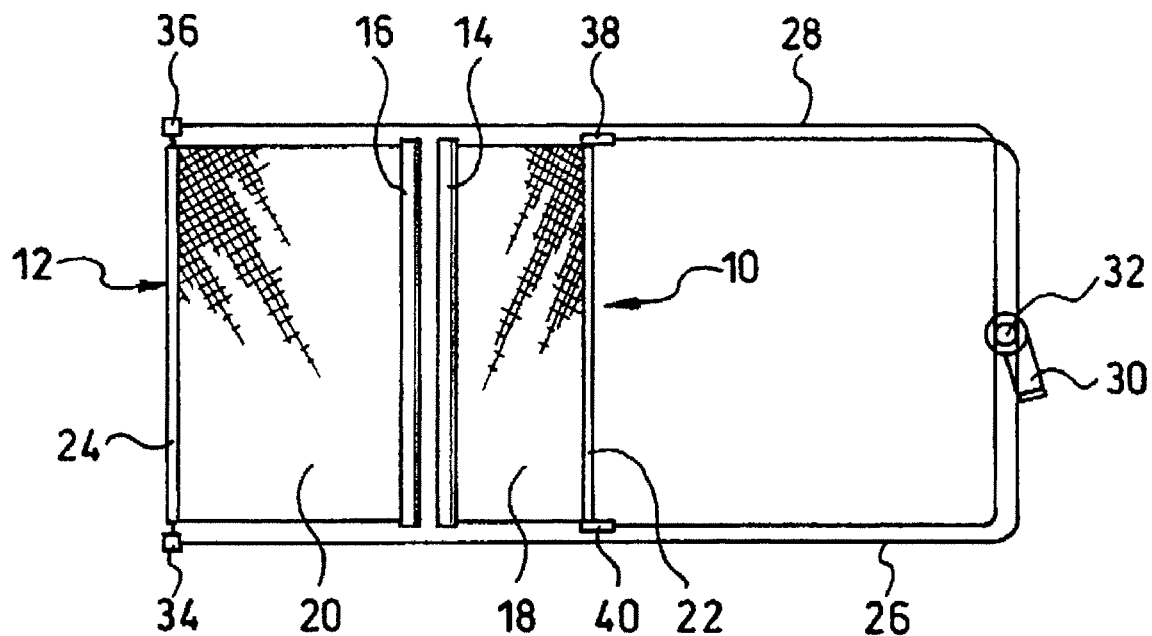
FIG. 1 shows a schematic view of the shade system as claimed in the invention from underneath.

As claimed in FIG. 1, the shade system for a motor vehicle roof comprises a front shade arrangement 10 and a rear shade arrangement 12 which are located in succession in the lengthwise direction of the roof in order to selectively cover or at least partially expose one or more transparent roof sections from underneath with respect to the vehicle interior in order to make light incidence and incident solar radiation into the vehicle interior variable according to the wishes of the passengers. The two shade arrangements 10, 12 consist essentially of a take-up shaft 14 and 16 onto which one length of shade 18 and 20 can be wound, proceeding from its one end, or can be unwound from it. The other free end of the length of shade 18, 20 is provided with a pull 22 and 24 which is used for actuation of the shade arrangement 10 and 12.

The two shade arrangements 10, 12 can be actuated in the opposite direction, i.e. for unwinding or unrolling the length of shade 18 and 20 the pulls 22 and 24 must be moved in the opposite direction. In the example shown in FIG. 1, the two take-up shafts 14 and 16 are arranged adjacent to one another, i.e. the shade arrangements 19, 10 are located "back to back".

The take-up shafts 14, 16 are pretensioned in the take-up direction, for example by means of a suitable spring arrangement.

The two pulls 22, 24 are movably guided each laterally in a roof-mounted guide (not shown) in the lengthwise direction of the roof.

To actuate the shade arrangements 10, 12 there is a common drive system which comprises two drive cables 26 and 28 and one electric motor 30 with a pinion 32 driven by the motor 30, the pinion 32 on its outer periphery engaging two drive cables 26, 28 in the conventional manner in order to drive them in the opposite direction.

The two drive cables 26, 28 are made compressively stiff and are movably guided in the corresponding cable guides (not shown). Each of the drive cables 26, 28 at a first point 34 and 36 is securely engaged to one of the lateral ends of the pull 24 of the rear shade arrangement 12 and at a second point 38 and 40 engages one of the two side ends of the pull 22 of the front shade arrangement 10. The first point 34 and 36 and the second point 38 and 40 are located on opposing ends of the respective drive cable 26 and 28, the pinion 32 acting in between. Each drive cable 26, 28 is deflected twice by 90° at a time, the two drive cables 26, 28 together forming a configuration which is U-shaped in a top view and the pinion 32 acting in the connecting area between the two "legs" of the U. In this configuration the respective first point 34 and 36 and the respective second point 38 and 40 move in the opposite direction, the respective first point 34 and 36 acting on the pull 24 on the side other than the respective second point 38 and 40 on the other pull 22.

In the example shown in FIG. 1, the extension length of the length of shade 20 of the front shade arrangement 12 is greater than the extension length of the length of shade 18 of the rear shade arrangement 10. In order to be able to drive the two pulls 22 and 24 with the same drive cable 26 and 28, the coupling between the second point 38, 40 and the pull 22 is made releasable by means of one locking element 42. In this connection the second point 38 and 40 is securely coupled in a first segment of motion of the second point 38 and 40 to the pull 22, while in a subsequent second segment of motion it is decoupled from the pull 22, the coupling or decoupling taking place automatically when the boundary is reached between the first and the second segment of motion by means of the locking element 42, as is detailed below with reference to FIGS. 2 to 6.

Figure 2:
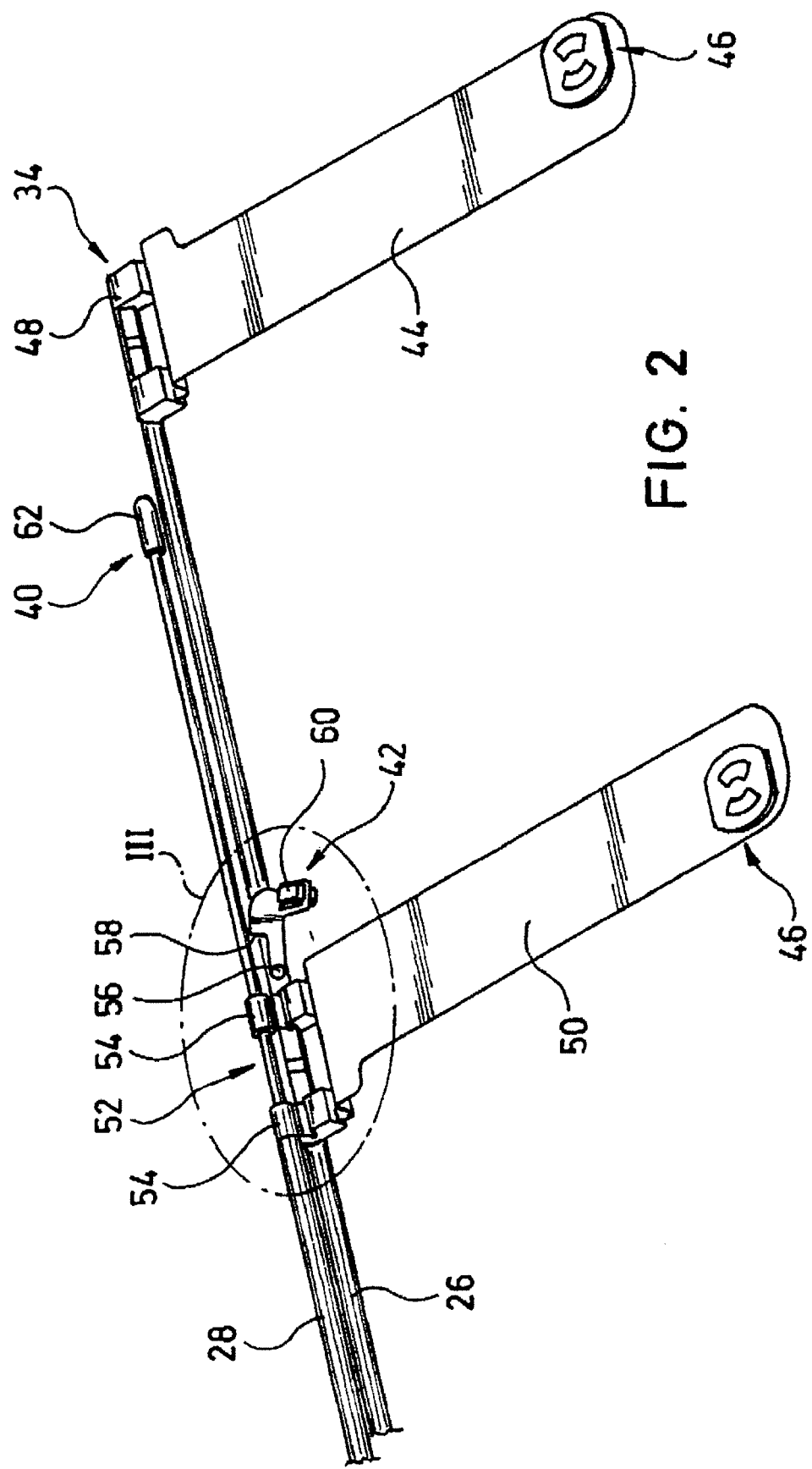
FIG. 2 shows a schematic perspective of one of the two drive lines, one of the two drive cables being shown in the decoupled state.

As shown in FIG. 2, for the linkage of the pull 24 to the drive cable 26 there is an extension arm 44 which on the inner end has a pull link 46 and on its outer end is securely connected by means of a molded part 48 at the first point 34 to the drive cable 26. For linkage of the pull 22 to the drive cable 28 there is an extension arm 50 which on its inner end is provided with a pull link 46 and on its outer end is provided with a coupling element 52. The coupling element has two slideway elements 54 which surround the drive cable 28 such that it is movably guided within the slideway elements 54. Furthermore, the coupling element 52 has a ratchet 42 which is mounted to be able to pivot around a pivot bearing 56 with respect to the coupling element 52. The ratchet has a projection 58 and link pin 60.

The drive cable 28 is provided on one end with a sleeve which is made as an end cap 62 and which surrounds the drive cable and functionally forms the second point 40.

The manner of operation of the coupling element 52 is detailed with reference to FIGS. 3 to 6.

Figure 3:
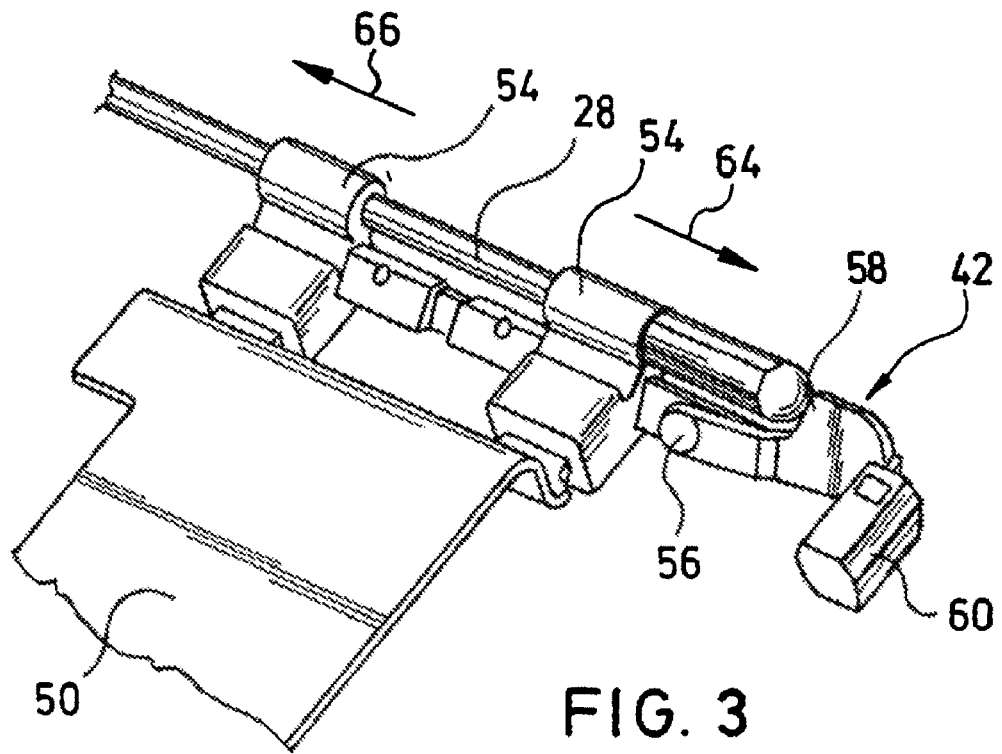
FIG. 3 shows an enlarged perspective of the region III from FIG. 2, however the drive cable being shown in the coupled state.
Figure 4:
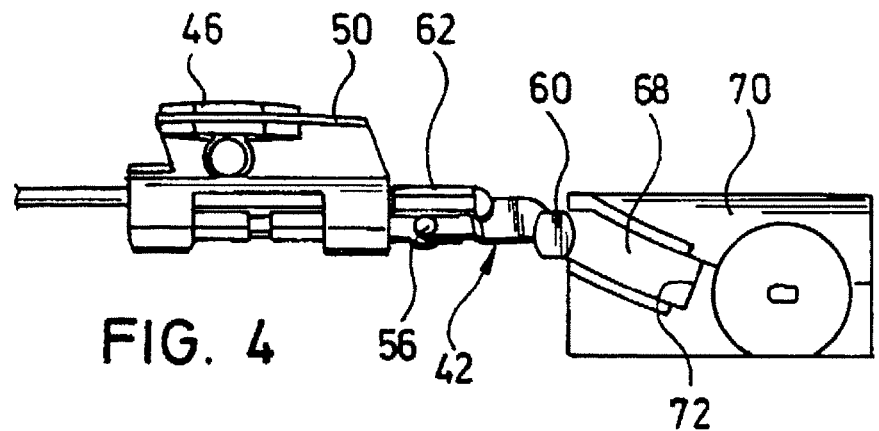
FIG. 4 shows a corresponding side view to FIG. 3.

In FIGS. 3 and 4 the coupling element 52—in contrast to FIG. 2—is shown in the state in which it is securely engaged to the drive cable 28, i.e. in this position the extension arm 50 and thus the pull 22 are coupled securely to the drive cable 28. This coupling takes place in the push direction (direction of arrow 64) by contact of the tip of the end cap 62 against the projection 58 of the ratchet 42, which for example either by the force of gravity or spring pretensioning is held in the position shown in FIGS. 3 and 4. In the pull direction (direction of arrow 66) coupling takes place by contact of the end of the end cap 62 opposite the tip on one of the two slideway elements 54. The fixed coupling between the drive cable 28 and the extension arm 50 shown in FIGS. 3 and 4 prevails as long as the second point 40 of the drive cable 28, i.e. the end cap 62, is moved in the free extension region of the length of shade 18 (this is the first segment of motion of the second point 40).

But as soon as the end cap 62 and with it the coupling element 52 and the extension arm 50 reach the end position of the extension arm 50 or of the pull 22, in which the length of shade 18 is completely taken up, the fixed coupling between the coupling element 52 and the drive cable 28 is released.

This takes place in that the link pin 60 of the ratchet 42 runs into the link slot 68 of a roof-mounted link 70 and is guided in it by a corresponding tilt of the link pin 60 such that the ratchet 42 is pivoted around the pivot bearing 56 with respect to the coupling element 52 such that the projection 58 disengages from the tip of the end cap 62 so that the end cap 62 comes free from the coupling element 52. A stop 72 in the link slot 68 for the link pin 60 ends the motion of the coupling element 52 and thus of the extension arm 50 or the pull 22, while the drive cable 28 can move further by the corresponding sliding guidance in the slideway elements 54. This continued motion of the drive cable 28 is therefore necessary because the other end of the drive cable 28 at the point 34 is coupled securely to the pull 24 of the front shade arrangement 12 which has a greater extension length than the length of shade 18 of the rear shade arrangement 10.

Figure 5:
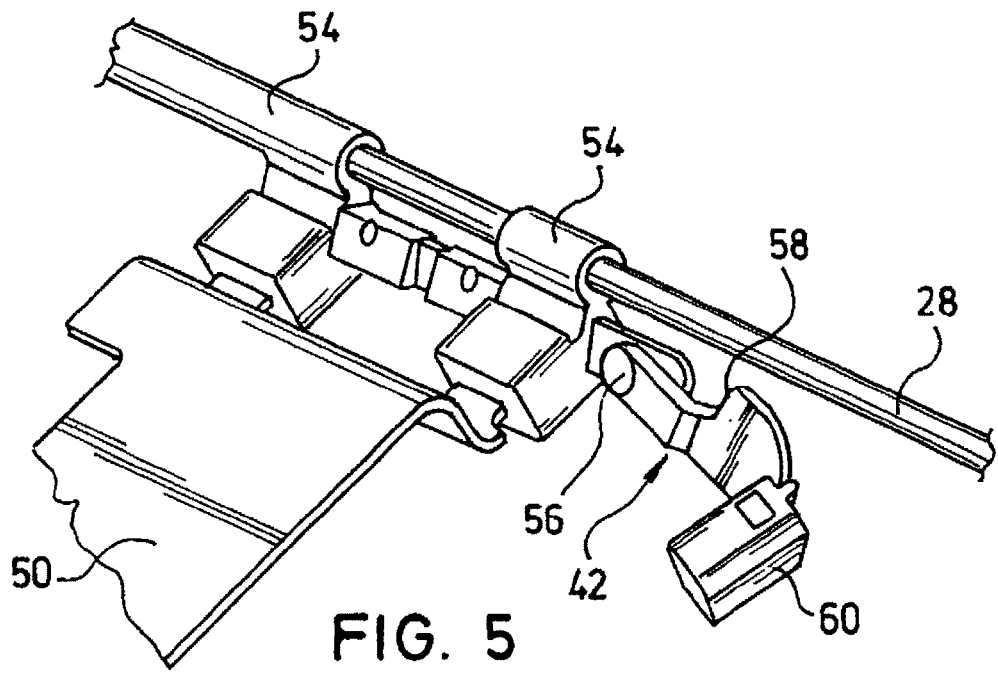
FIGS. 5 and 6 show views like FIG. 3 and FIG. 4, but the decoupled state of the drive cable shown in FIG. 2 being illustrated.
Figure 6:
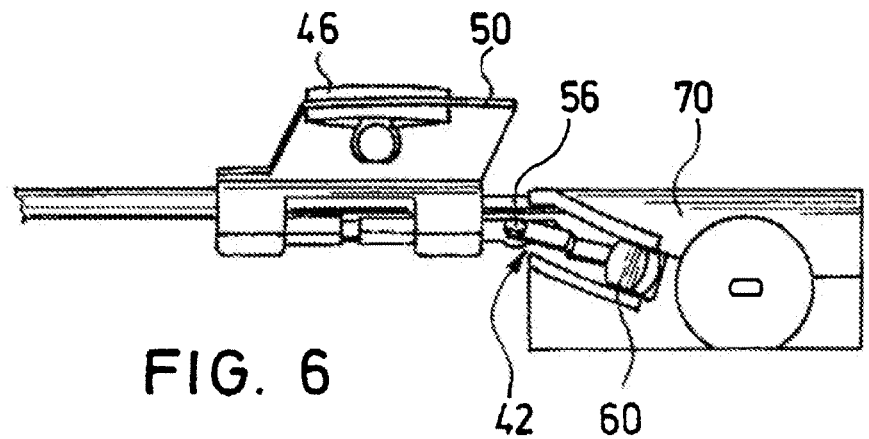

The decoupled position of the coupling element 52 is shown in FIGS. 5 and 6.

The link 70 is omitted in FIGS. 3 and 5.

The sequence in which the two shade arrangements 10 and 12 are wound up was described above. When the shade arrangements 10 and 12 are being unwound, the described sequence proceeds in the reverse direction, i.e. first only the length of shade 20 of the rear shade arrangement 12 is unwound by displacing the pull 24, the operating cable 28 in FIGS. 5 and 6 moving in the direction of the part 66 and in doing so sliding in the slideway elements 54. As soon as the end cap 62 has traversed a path which corresponds to the difference of the extension length between the two shade arrangements 10 and 12, the end cap 62 with its end facing away from the tip reaches the slideway element 54 which lies nearer the ratchet 42 and is placed against it, by which at this point the coupling element 52 and the extension arm 50 and the pull 22 are entrained from then on by the end cap 62 and move in the direction of the arrow 66. In this way the link pin 60 of the ratchet 62 again leaves the link slot 68, by which the ratchet 42 with the projection 58 in FIGS. 6 and 4 again swivels up, so that the projection 58 is again placed against the tip of the end cap 62 and engages it. By entraining the slideway element 54 by the end cap 62, the pull 23 is withdrawn and thus the length of shade 18 of the front shade arrangement 10 is unwound or pulled out.

Figure 7:
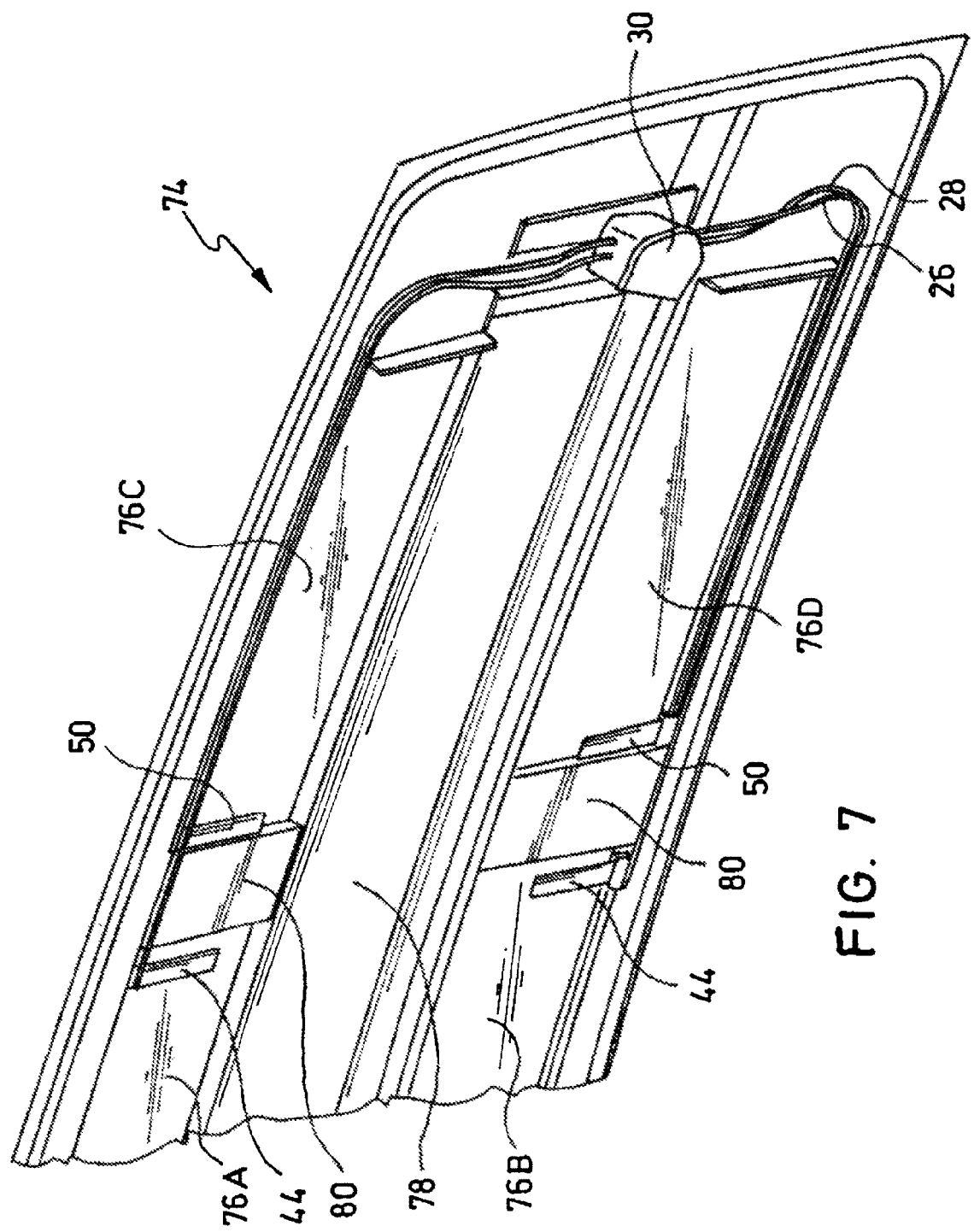
FIG. 7 shows a schematic perspective from obliquely underneath of the shade system as claimed in the invention.

FIG. 7 schematically shows an example for implementation of the principle shown in FIGS. 1 to 6 for a roof module 74 which has four transparent roof sections 76A to 76D which are to be shaded selectively by a shade system (the take-up shafts and the lengths of shade are omitted in FIG. 7). The two front roof sections 76A, 76B are longer than the rear roof sections 76C and 76D so that for the front roof sections 76A, 76B a shade arrangement with a greater extension length than for the rear roof sections 76C, 76D is necessary. In this respect the shade system shown in FIGS. 1 to 6 meets this requirement.

But since the roof module 74 has a center bracket 78, a shade system which covers the entire width of the roof module cannot be used here, but each of the two shade arrangements 10 and 12 from FIG. 1 is split into two mirror-symmetrical sections divided by the center bracket 78. In this connection it is feasible to divide the lengths of shade 18, 20, the take-up shafts 14, 16 and the pulls 22, 24 into two sections which are symmetrical with respect to the center bracket 78. The pulls can be guided with one side on the center bracket 78 and with the other in the edge region of the roof module 74. The take-up shafts are feasibly located in the area of the crosspiece 80 between the roof sections 76A, 76B and 76C, 76D.

In the case of pulls driven on both sides as in FIG. 1, the linkage of the pulls 22, 24 to the drive cables 26, 28 can take place either directly (in this case the elements 48 and 52 from FIG. 2 would be directly connected to the respective pull instead of to the extension arms 44, 50) or as shown in FIG. 2 via a connecting element, for example an extension arm 44, 50.

What is claimed is:

1. Shade system for a motor vehicle roof, with at least one first (12) and one second shade arrangement (10) which are arranged in line with one another in the lengthwise direction of the roof and each have a take-up shaft (14, 16), a length of shade (18, 20) which proceeding from one end can be taken up thereon, and a pull (22, 24) which acts on a free end of the length of shade, and at least one compressively stiff drive cable (26, 28) which is driven by a drive (30, 32) and which is securely coupled at a first point (34, 36) to the pull (24) of the first shade arrangement (12), characterized in that the drive cable (26, 28) is securely coupled at a second point (38, 40, 62) to the pull (22) of the second shade arrangement (10) in a first segment of motion of the second point and in a subsequent second segment of motion of the second point is decoupled from the pull of the second shade arrangement, the coupling or decoupling taking place automatically when the boundary is reached between the first and the second segment of motion by means of a locking element (42).

2. Shade system as claimed in claim 1, wherein there are two of the compressively stiff cables (26, 28) which are driven jointly by the drive in the opposite direction and each acts on opposing lateral ends of the respective pull (22, 24) via the first (34, 36) and the second points (38, 40, 62).

3. Shade system as claimed in claim 2, wherein one (26) of the drive cables acts on the left side of the pull (24) of the first shade arrangement (12) and on the right side of the pull (22) of the second shade arrangement (10), while the other (28) of the drive cables acts on the right side of the pull of the first shade arrangement and on the left side of the pull of the second shade arrangement.

4. Shade system as claimed in claim 3, wherein the drive has a motor (30) and a motor-driven pinion (32) which is located between the two drive cables (26, 28) and acts on its periphery on the two drive cables.

5. Shade system as claimed in claim 2, wherein the drive has a motor (30) and a motor-driven pinion (32) which is located between the two drive cables (26, 28) and acts on its periphery on the two drive cables.

6. Shade system as claimed in claim 1, wherein the drive (30, 32) acts on the drive cables (26, 28) between the first (34, 36) and the second point (38, 40, 62).

7. Shade system as claimed in claim 1, wherein the second point (38, 40) moves in the opposite direction to the first point (34, 36) and the two shade arrangements (10, 12) can be extended in the opposite direction to one another.

8. Shade system as claimed in claim 1, wherein the two take-up shafts (14, 16) are pretensioned in the take-up direction.

9. Shade system as claimed in claim 1, wherein the first point (34, 36) is located on one end of the drive cable (26, 28).

10. Shade system as claimed in claim 9, wherein the second point (38, 40, 62) is located on the other end of the drive cable (26, 28).

11. Shade system as claimed in claim 1, wherein the boundary between the first and the second segment of motion of the second point (38, 40, 62) corresponds to the end position of the pull (22) of the second shade arrangement (10) in a completely taken-up position of the length of shade (18) or in a completely unrolled position of the length of shade.

12. Shade system as claimed in claim 1, wherein the locking element (42) is connected to the pull (22) of the second shade arrangement (10) and depending on its position along the direction of motion of the pull of the second shade arrangement is automatically positioned between a locking position and a release position.

13. Shade system as claimed in claim 12, wherein the locking element (42) is positioned between a locking position and a release position by engagement of the locking element with a link path (68) which is stationary with respect to the vehicle roof.

14. Shade system as claimed in claim 13, wherein the locking element is made as a ratchet (42) which can be pivoted with respect to the pull (22) of the second shade arrangement (10).

15. Shade system as claimed in claim 14, wherein the ratchet (42) has a link element (60) which engages the link path (68).

16. Shade system as claimed in claim 15, wherein the link path is made as a link slot (68) and the link element is made as a link pin (60) which is guided in it.

17. Shade system as claimed in claim 1, wherein there is a slideway element (54) which is connected to the pull (22) of the second shade arrangement (10) for the drive cable (26, 28).

18. Shade system as claimed in claim 17, wherein the slideway element (54) acts as a driver with respect to the second point (62) in the other (66) of the two drive directions of the drive cable (26, 28).

19. Shade system as claimed in claim 18, wherein the second point (38, 40) is formed by a sleeve (62) which surrounds the drive cable (26, 28), with one end made to engage the locking element (42) and with the other end made to engage the slideway element (54).

20. Shade system as claimed in claim 1, wherein the locking element (42) acts only in one (64) of the two drive directions of the drive cable.

21. Shade system as claimed in claim 1, wherein there are two of the compressively stiff drive cables (26, 28) and four of the shade arrangements, the drive cables being jointly driven by the drive (30) in the opposite direction and the first (34, 36) or second point (38, 40, 62) of each drive cable acting on the other of the pulls at the time.

22. Shade system as claimed in claim 21, wherein the shade arrangements are arranged in pairs in succession, the two shade arrangements of each pair being made symmetrical with respect to the lengthwise direction of the roof, the first of the drive cables acting on the pull of the front left shade arrangement and on the pull of the rear right shade arrangement, while the second of the drive cables acts on the pull of the front right shade arrangement and on the pull of the rear left shade arrangement.

23. Shade system as claimed in claim 22, wherein each pull is connected to an extension arm element (44, 50), the extension arm elements (44) assigned to the first point of the drive cable being securely connected to the respective drive cable (26, 28) and the extension arm elements (50) assigned to the second point being automatically coupled to the respective drive cable or decoupled from it when the boundary is reached between the first and the second segment of motion by means of the locking element (42).

24. Shade system as claimed in claim 21, wherein each pull is connected to an extension arm element (44, 50), the extension arm elements (44) assigned to the first point of the drive cable being securely connected to the respective drive cable (26, 28) and the extension arm elements (50) assigned to the second point being automatically coupled to the respective drive cable or decoupled from it when the boundary is reached between the first and the second segment of motion by means of the locking element (42).

* * * * *